United States Patent
Ard

(10) Patent No.: US 7,164,420 B2
(45) Date of Patent: Jan. 16, 2007

(54) RAY TRACING HIERARCHY

(75) Inventor: Cleve Ard, Matthews, NC (US)

(73) Assignee: Autodesk, Inc., San Rafael, CA (US)

( * ) Notice: Subject to any disclaimer, the term of this patent is extended or adjusted under 35 U.S.C. 154(b) by 224 days.

(21) Appl. No.: 10/897,048

(22) Filed: Jul. 22, 2004

(65) Prior Publication Data

US 2005/0017971 A1     Jan. 27, 2005

Related U.S. Application Data

(60) Provisional application No. 60/489,719, filed on Jul. 24, 2003.

(51) Int. Cl.
*G06T 17/00*     (2006.01)
(52) U.S. Cl. ...................... 345/423; 345/531
(58) Field of Classification Search ............... None
See application file for complete search history.

(56) References Cited

U.S. PATENT DOCUMENTS

2003/0227455 A1* 12/2003 Lake et al. ................ 345/421
2004/0130552 A1* 7/2004 Duluk et al. .............. 345/506

FOREIGN PATENT DOCUMENTS

JP     2001934783 A     2/2001

OTHER PUBLICATIONS

Aronov et al., Cost-Driven Octree Construction Schemes: An Experimental Study, Jun. 2003, ACM Press, pp. 227-236.*

* cited by examiner

*Primary Examiner*—Mark Zimmerman
*Assistant Examiner*—Andrew Yang
(74) *Attorney, Agent, or Firm*—Patterson & Sheridan, L.L.P.

(57) ABSTRACT

A hierarchy of bounding volumes for objects is generated for use during ray tracing. The hierarchy of bounding volumes improves image quality and well as processing time during rendering. A memory cost factor is identified that relates to the increase in the amount of memory for a subdivided volume compared to its undivided form. An estimate is made of the average number of surface intersections made with a ray passing through the undivided volume and the divided volume, and a factor is evaluated that measures the reduction in such intersections resulting from the subdivisions. A comparison between the memory cost factor and the intersection reduction factor determines whether or not a bounding volume is further subdivided. These tests are then applied recursively to the newly created bounding volumes.

20 Claims, 18 Drawing Sheets

RAY TRACING HIERARCHY

CROSS-REFERENCE TO RELATED APPLICATIONS

This application claims benefit of U.S. provisional patent application Ser. No. 60/489,719, filed Jul. 24, 2003, which is herein incorporated by reference.

BACKGROUND OF THE INVENTION

1. Field of the Invention

The present invention relates to ray tracing a three-dimensional scene. In particular it relates to creating a hierarchy of bounding volumes for efficient ray tracing.

2. Description of the Related Art

Realistic methods of rendering a virtual three-dimensional scene include radiosity and ray tracing. Both methods are computationally intensive and cannot be performed in real time. Improvement in the speed of these rendering techniques is extremely useful.

Ray tracing can be accelerated by creating a hierarchy of bounding volumes for objects in a scene. As each ray is traced, the number of tests necessary to determine ray-object interactions is reduced considerably. However, creation of an efficient hierarchy of bounding volumes is itself a difficult problem, with many trade-offs between speed, quality and memory requirements. Complex strategies for resolving these conflicting requirements result in a reduction in the efficiency of code, or variations in quality that are difficult to predict. Complex strategies for creating a hierarchy of bounding volumes are therefore limited in their reliability.

SUMMARY OF THE INVENTION

According to an aspect of the invention a method is provided for ray tracing a virtual scene comprising objects in three-dimensional space in which a bounding volume for said objects is recursively subdivided into smaller bounding volumes according to the efficiency with which the scene may then be rendered by ray tracing. An efficient hierarchy of bounding volumes improves quality as well as processing time, since it is possible to apply processing effort at those parts of the scene that most require it, if the hierarchy of bounding volumes is appropriately constructed.

One embodiment of a system and method for generating a hierarchy of bounding volumes for objects in a three-dimensional space includes identifying an outer bounding volume including the objects, computing a memory cost factor, computing a face intersection factor, subdividing the outer bounding volume into a set of smaller bounding volumes based on the memory cost factor and the face intersection factor, and recursively subdividing each smaller bounding volume within the set of smaller bounding volumes to produce a set of recursively smaller bounding volumes based on a memory cost factor and a face intersection factor computed for each smaller bounding volume, the outer bounding volume and the set of recursively smaller bounding volumes defining the hierarchy of bounding volumes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
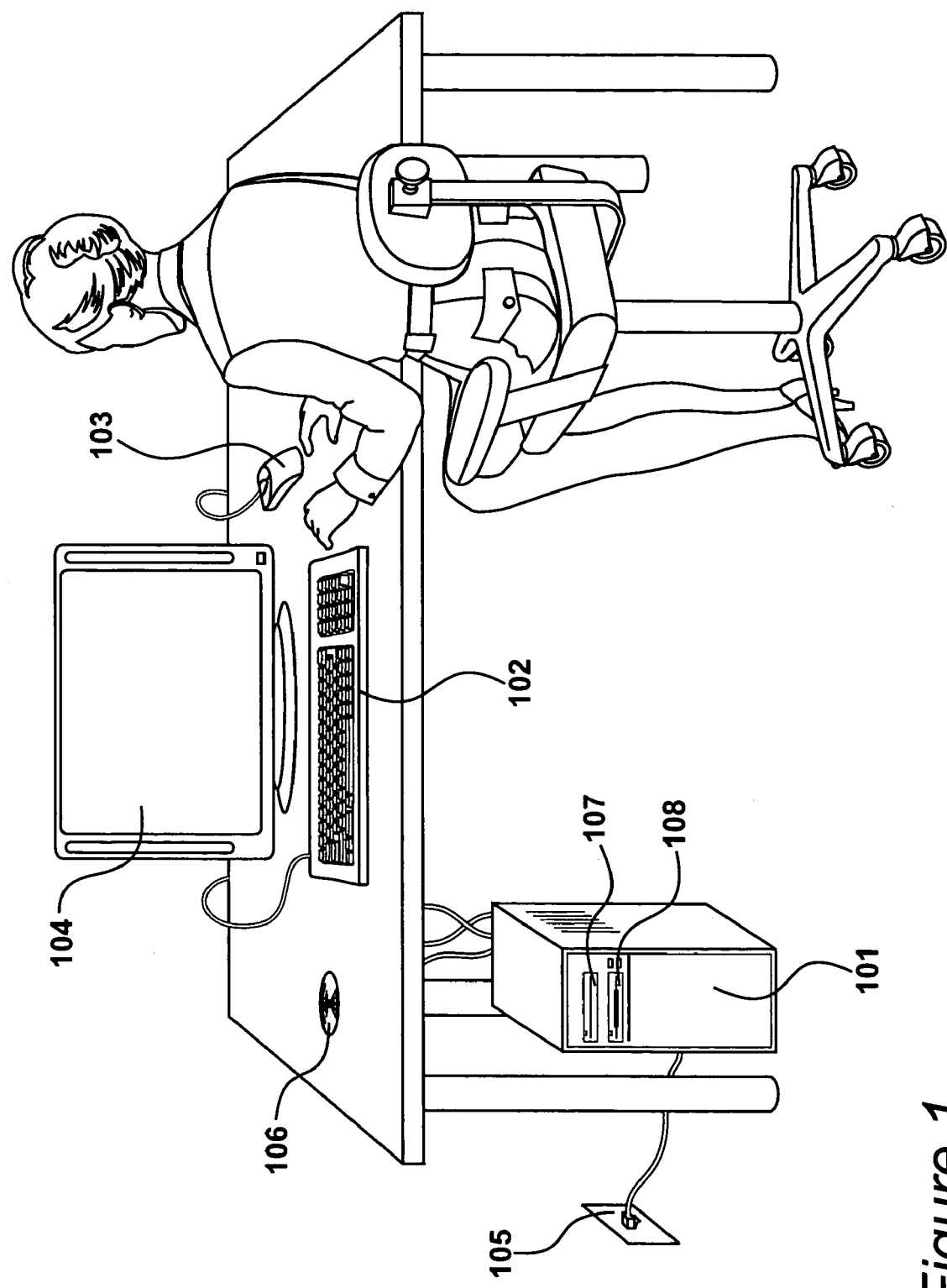
FIG. 1 shows a graphical workstation, including a processing system, a CDROM disk, a network and a monitor, according to one embodiment of the present invention.

FIG. 1 shows a graphical workstation at which graphical design and rendering processes are performed, according to one embodiment of the present invention. A processing system 101 receives user input signals from a keyboard 102 and from a mouse 103 or other pointing device. Results of processing and user interfaces are displayed on a monitor 104, thereby providing fully interactive graphical processing. A network connection supplies signals to and from the processing system 101 over a network 105, over which instructions and data for the processing system 101 may be transferred. The processing system 101 has a CDROM/DVD drive, and a CDROM 106 or the network 105 provides instructions for performing design operations using the processing system 101.

The graphical workstation shown in FIG. 1 is used for designing scenes containing complex three-dimensional virtual objects. Objects are defined individually and may comprise many parts. The scene is defined in the form of a data structure known as a scene tree. Once the scene has been defined by the user, finished results are obtained by rendering the scene to a high degree of quality. A common technique for obtaining photo-realistic rendered scenes is ray-tracing. Ray tracing traces virtual rays through a scene and maps their interaction between light sources and objects. High quality ray tracing algorithms require a lot of processing, and so any form of optimisation that can be performed is valuable.

Figure 2:
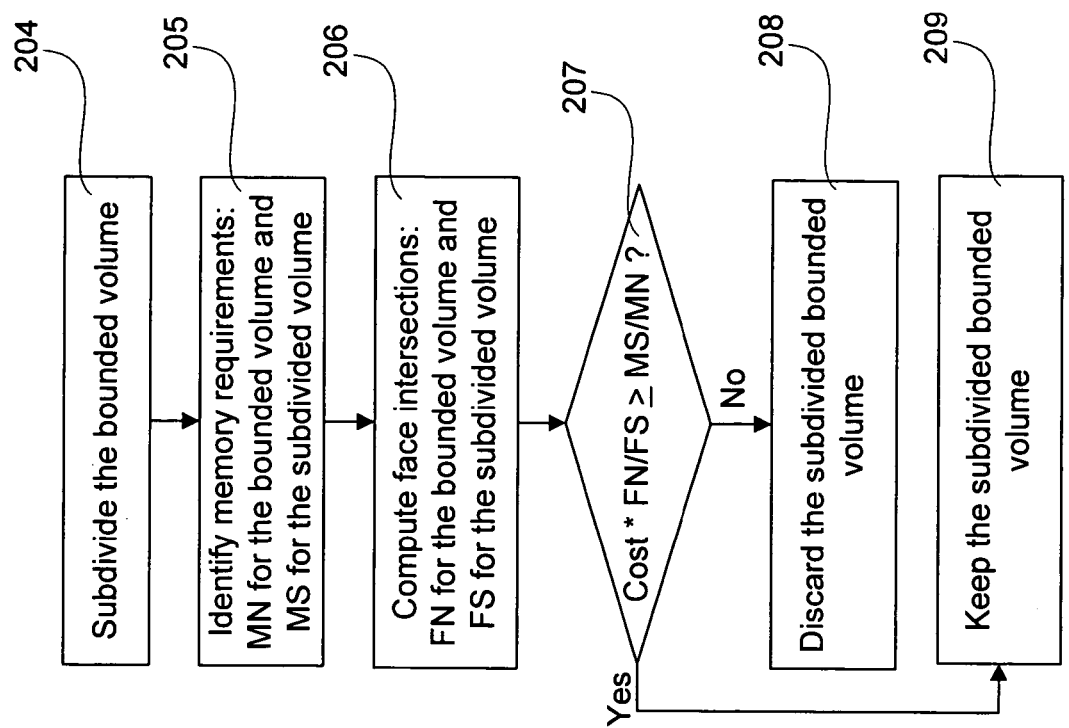
FIG. 2 summarises the invention operating on the processing system shown in FIG. 1, according to one embodiment of the present invention.
Figure 2:
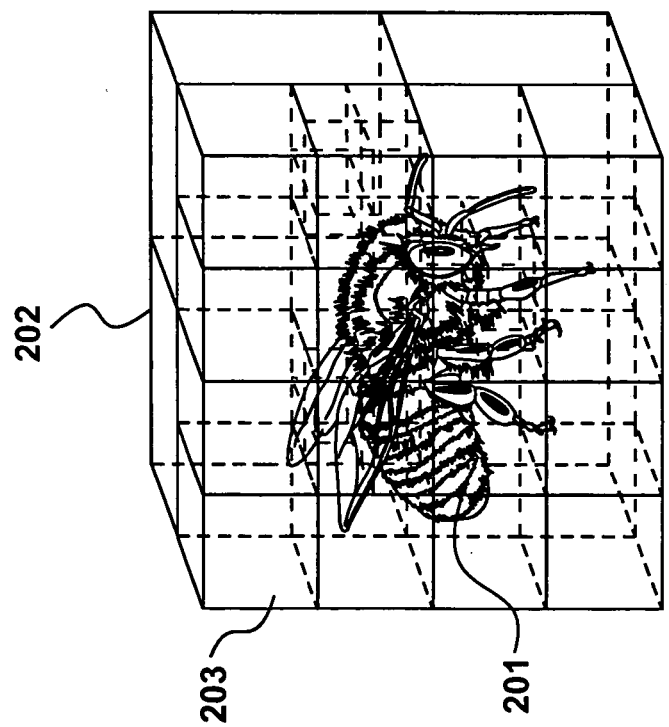

FIG. 2 shows one embodiment of the present invention. A honeybee 201 has been designed by the user. It is an extremely intricate object, comprising many fine details. In order to render this object 201, virtual light rays are traced between the object and a light source, so that shading of the many features of the object 201 will be performed to sufficient degree that it looks realistic. Since the surface of the object 201 comprises many thousands of different objects, it is very time consuming to determine which light rays interact with each object. The scene is subdivided into bounding volumes 202, 203. The bounding volumes contain several component parts of the object 201, and each of these component parts has one or several faces with which light rays may interact. By containing several object faces within a subdivision, the amount of processing required for ray-tracing is reduced, since it is possible to exclude a number of face-ray interactions by checking whether or not a ray intersects a particular bounding volume. This method has advantages at all scales, and so the bounding volumes 202 and 203 are subdivided recursively according to the level of detail required. Where the features of the object 201 are most intricate, the volumes are subdivided to the highest degree.

Constructing the hierarchy of bounding volumes 202, 203 is a time-consuming process. It also consumes significant memory resources in the processing system 101. Furthermore, it is difficult to design a set of bounding volumes that uses available resources of time and memory efficiently, while still providing photo-realistic rendering of the highest possible quality.

Improved steps for subdividing volumes into a hierarchy are shown in FIG. 2. At step 204, a bounded volume, such as bounding volume 202 or bounding volume 203 is recursively subdivided. At step 205 memory requirements are identified. A first value MN is defined for a bounded volume without subdivisions. A second value MS is defined for a subdivided volume. The values MN and MS are expressed in terms of the memory usage required for the data structures that store the bounded volumes. They may be estimates or precisely known values, depending upon implementation characteristics.

At step 206, the number of face intersections is calculated. A first value FN is calculated for the number of face intersections that would need to be checked between a light ray and object faces within an undivided volume. A second value FS is calculated for the number of face intersections that would need to be checked between a light ray and object faces within a subdivided volume.

At step 207 the ratios FN/FS and MS/MN are compared. In some embodiments of the present invention FN/FS is scaled by a cost factor. The cost factor may be set using a configuration file and have a default value of 1.0. If the reduction factor in the number of faces is greater than the factor of. increase of memory usage for sub-division. then the subdivision of the volume is kept at step 209. Otherwise at step 208 the subdivision of the volume is discarded.

Once the hierarchy of bounding volumes has been created in this way, known ray-tracing techniques can be used to render an image of the object 201.

Figure 3:
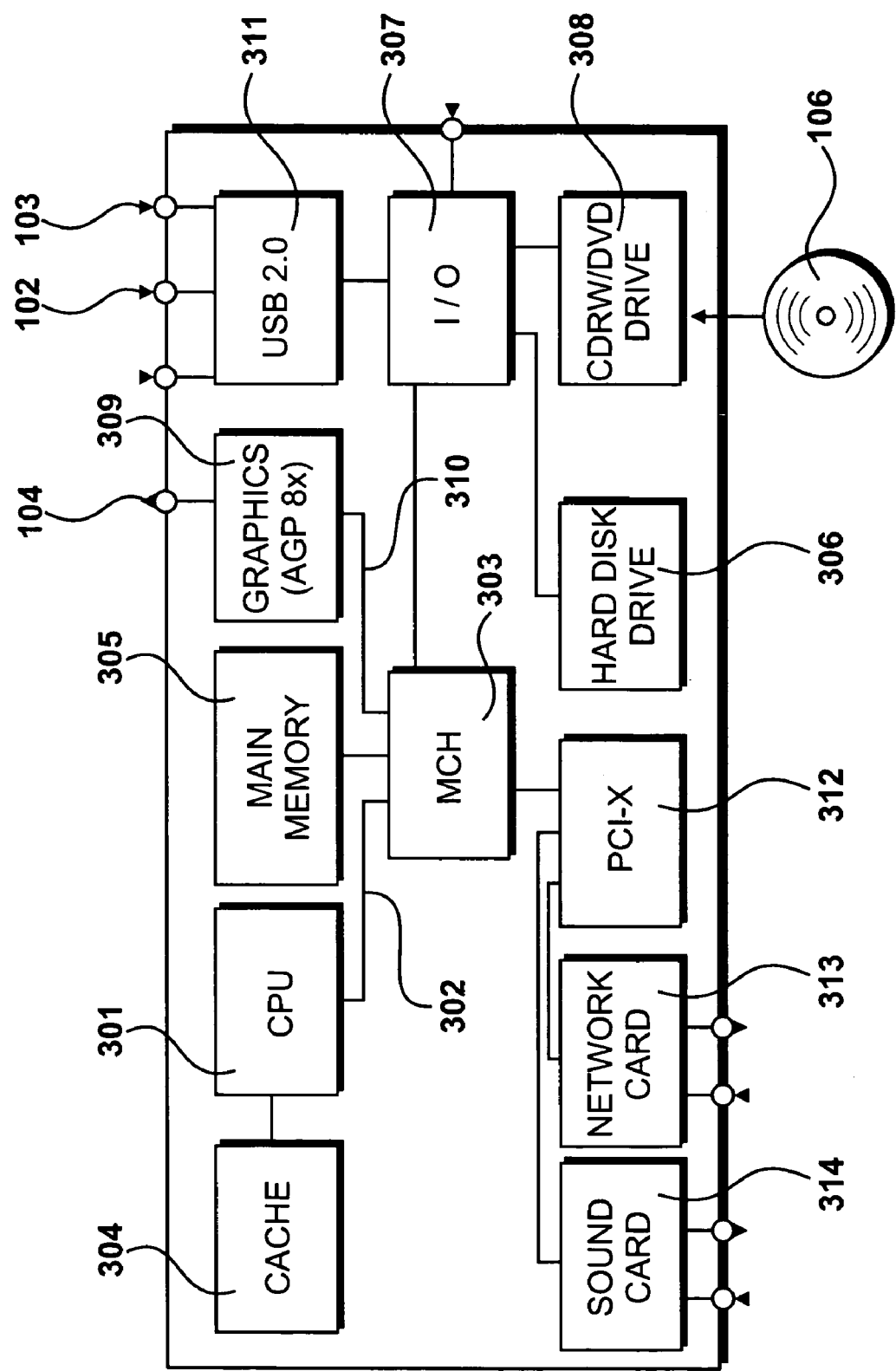
FIG. 3 details components of the processing system shown in FIG. 1, including a main memory and a hard disk drive, according to one embodiment of the present invention.

FIG. 3 shows the components of the processing system 101, according to one embodiment of the present invention. In some embodiments of the present invention, said components are based upon the Intel® E7505 hub-based Chipset.

The system includes an Intel® PentiuM™ Xeon™ central processing unit (CPU) 301 running at three Gigahertz, which fetches instructions for execution and manipulates data via an Intel® E7505 533 Megahertz system bus 302 providing connectivity with a Memory Controller Hub (MCH) 303. The CPU 301 has a secondary cache 304 comprising five hundred and twelve kilobytes of high speed static RAM, for storing frequently-accessed instructions and data to reduce fetching operations from a larger main memory 305 via the memory controller hub 303. The memory controller hub 303 thus co-ordinates data and instruction flow with the main memory 305, which is one gigabyte in storage capacity. Instructions and data are stored in the main memory 305 and the cache 304 for access by the central processing unit 301. A hard disk drive 306 provides non-volatile bulk storage of instructions and data via an Input/Output Controller Hub (ICH) 307. The I/O controller hub 307 similarly provides connectivity to DVD-ROM re-writer 308 which reads the CDROM 106 shown in FIG. 1. Connectivity is also provided to USB 2.0 interface 311, to which the keyboard 102 and mouse 103 are attached, all of which send user input data to the processing system 101.

A graphics card 309 receives graphic data and instructions from the central processing unit 301. The graphics card 309 is connected to the memory controller hub 303 by means of a high speed AGP graphics bus 310. A PCI interface 312 provides connections to a network card 313 that provides access to the network 105, over which instructions and or data may be transferred. A sound card 314 is also connected to the PCI interface 312 and receives sound data or instructions from the CPU 301.

The equipment shown in FIG. 3 constitutes the components of an IBM™ PC compatible processing system. Similar functionality can be provided using an Apple™ PowerPC™ architecture based processing system. More than one CPU 301 may be used, in a symmetrical multi-processing (SMP) or non-uniform memory architecture (NUMA) configuration. Other architectures may also be advantageously utilised, including portable processing systems and thin client processing systems attached to a network in which some or all of the design processing may be carried out either remotely or in a number of physically distinct processing systems.

Figure 4:
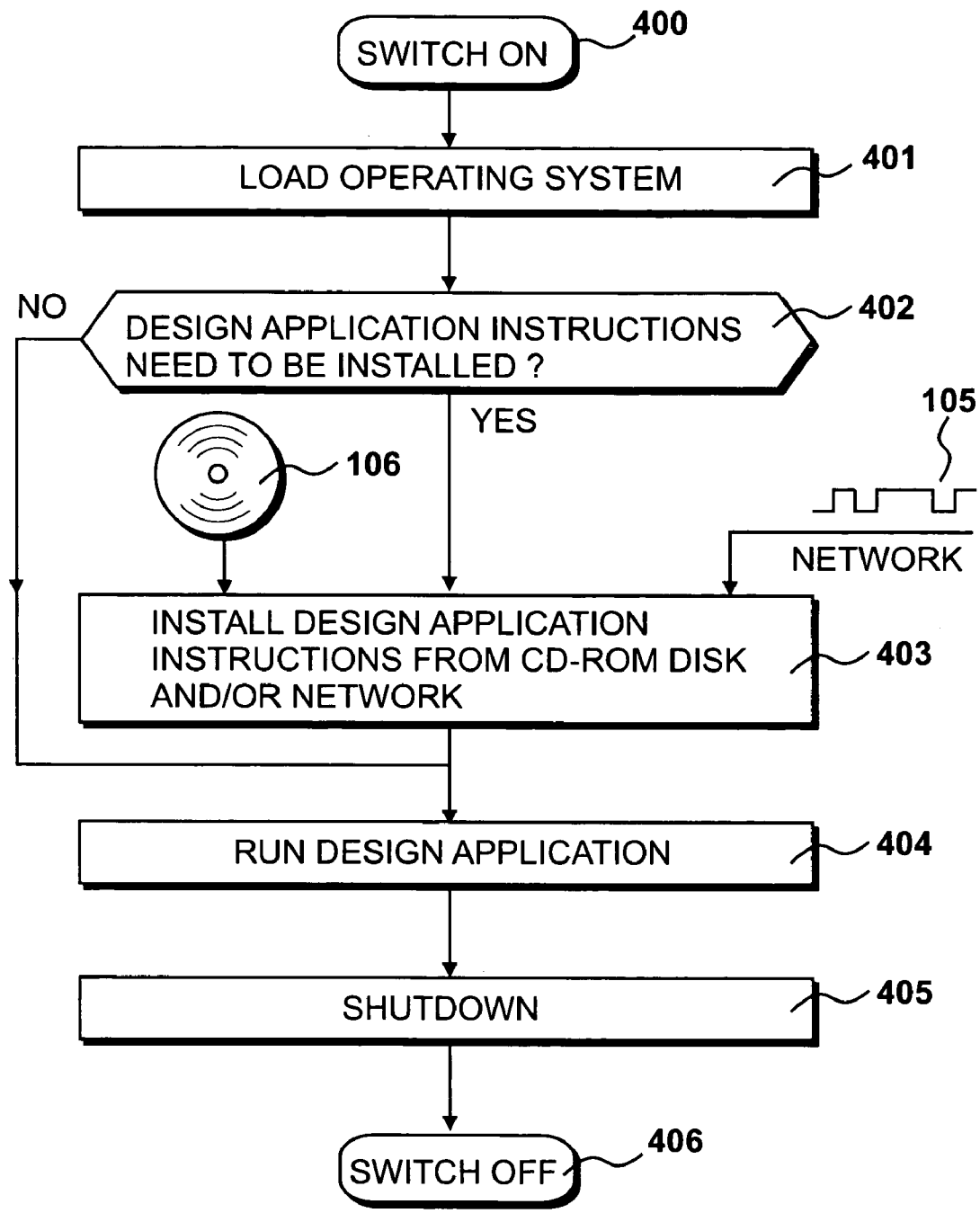
FIG. 4 details steps performed by the processing system shown in FIG. 1, including a step of installing a design application and a step of running a design application, according to one embodiment of the present invention.

FIG. 4 shows a summary of the operations performed by the processing system 101, according to one embodiment of the present invention. At step 400 the processing system 101 is switched on. At step 401 an operating system is loaded into the main memory 305 of the processing system. The processing system 101 is used to perform design operations for virtual objects 201, such as objects that may be used in computer games, virtual reality or computer-aided design. In order to do this, the processing system 101 needs to be loaded with appropriate instructions for creating, editing and rendering virtual objects 201. Usually such instructions are stored on the hard disk drive 306. At step 402 a question is asked as to whether such instructions need to be installed on the hard disk drive 306. If not, control is directed to step 404. Alternatively, at step 403, design instructions are installed onto the processing system either from the network 105 or the CDROM disk 106. At step 404 the design instructions are executed, thereby enabling the user to create and modify objects, including object 201, as required.

Figure 5:
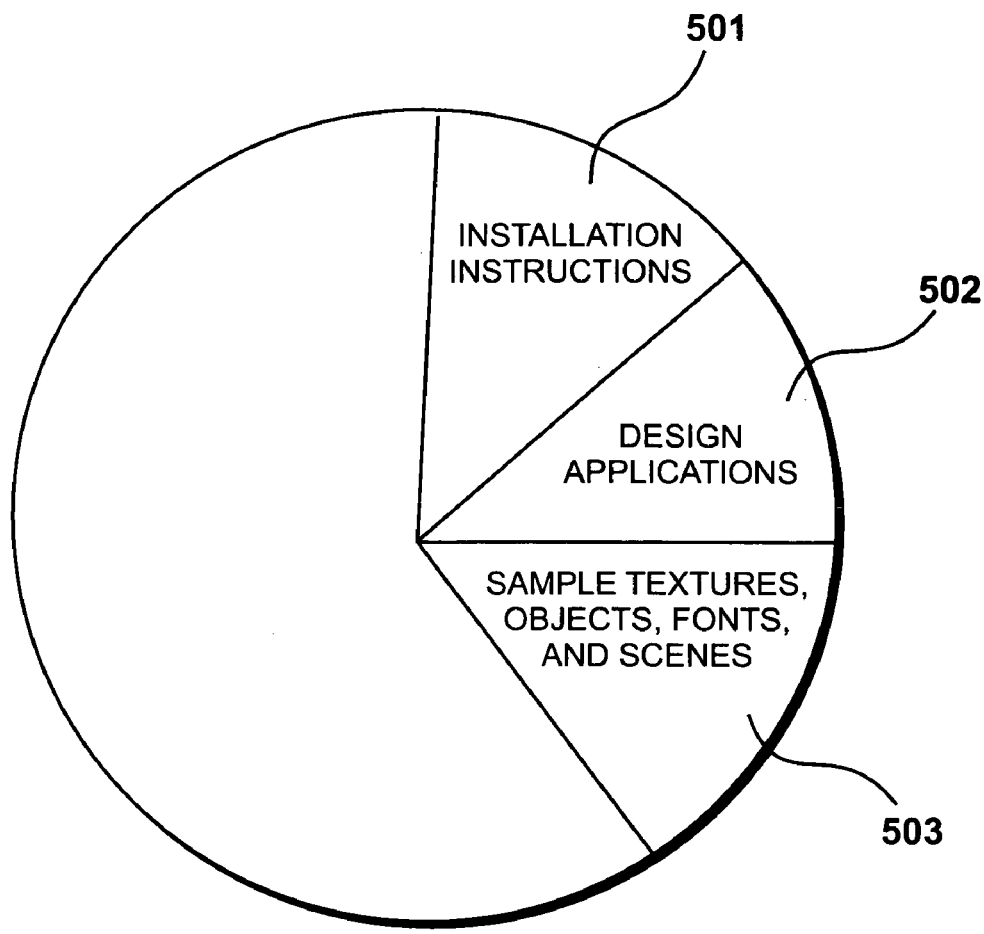
FIG. 5 summarises contents of the CDROM disk shown in FIG. 1.
Figure 6:
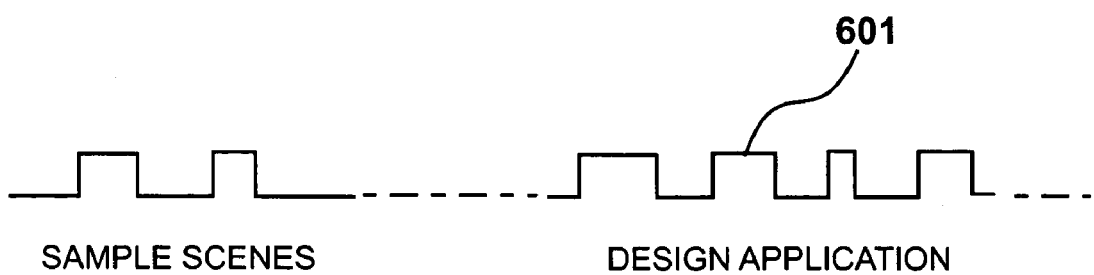
FIG. 6 illustrates transfer of design application instructions over the network shown in FIG. 1, according to one embodiment of the present invention.

FIG. 5 shows contents of the CDROM 106 shown in FIG. 1, according to one embodiment of the present invention. The arrangement of data is intended to be symbolic and not representative of the actual physical storage configuration on the disk 106 itself. Installation instructions 501 are provided to decompress, format and disperse design application instructions 502 onto the hard disk drive 306. The design application 502 may also be supplied with additional data, such as clipart, surface textures and fonts as indicated at 503. Design application instructions 502 and data 503 may alternatively be installed over the network 105, as indicated in FIG. 6, according to one embodiment of the present invention. When this is done, the instructions and data are encoded as a serial stream of electrical impulses 601, that are decoded, error corrected, decompressed and installed according to protocols that are well known in the art.

Figure 7:
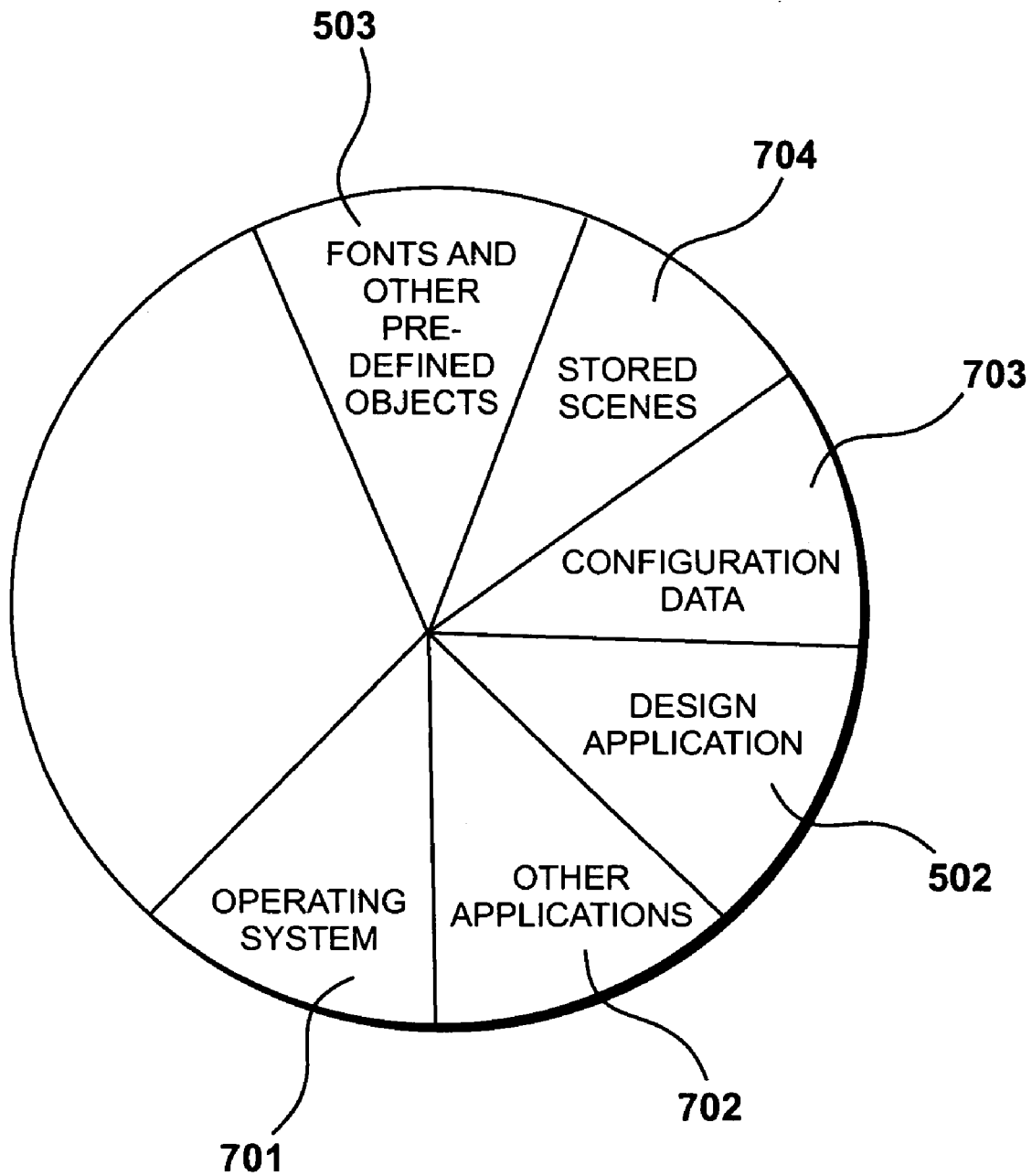
FIG. 7 details contents of the hard disk drive shown in FIG. 1, after the installation step shown in FIG. 4, according to one embodiment of the present invention.

After installation 403 has taken place, the contents of the hard disk drive 306 are updated to provide non-volatile storage of the new instructions and data. FIG. 7 shows relevant data structures, according to one embodiment of the present invention. A Windows™ XP™ operating system 701 provides common functionality and device abstraction for several applications 702 running on the processing system 101. A different operating system may be used, such as a Macintosh™, Unix™ or Linux™ operating system. The design application 502 is located on the hard disc 306 in uncompressed form. Configuration data for the particular processing system 101 is stored at 703, providing the user with various options that are suitable for their working style. Fonts and pre-defined objects 503 are also stored in uncompressed form, although it is possible that data storage on the hard disk drive 306 or other non-volatile storage unit, may advantageously be done in compressed form in some circumstances.

Figure 8:
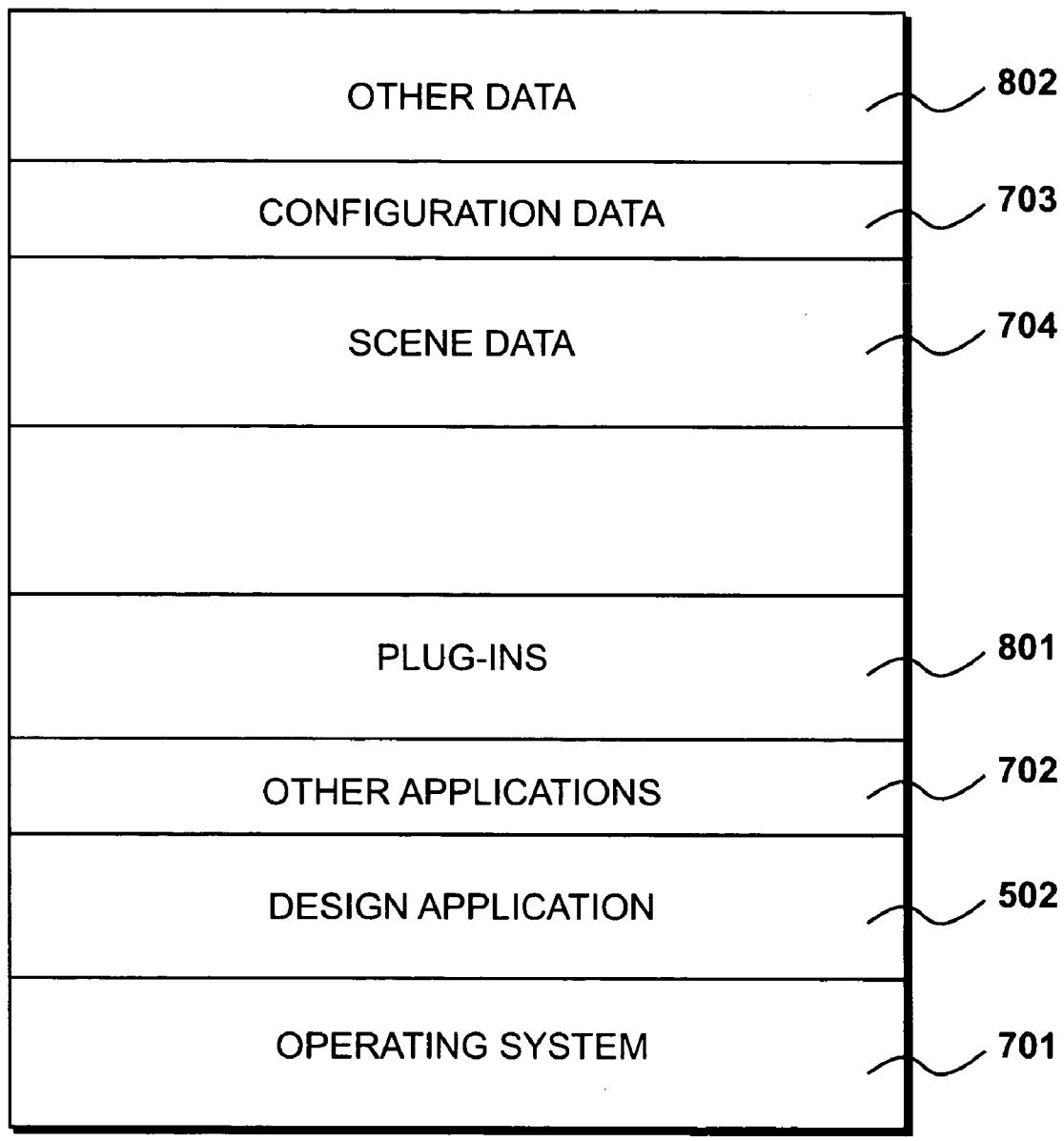
FIG. 8 details contents of the main memory shown in FIG. 3, according to one embodiment of the present invention.

When the user starts execution of the design application instructions 502 at step 404, the contents of the main memory 305 are as shown in FIG. 8, according to one embodiment of the present invention. The contents of the main memory 305 include the operating system 701, the design application 502 and other applications 702. When executing a design application such as the design instructions 502 for rendering three-dimensional scenes, many different algorithms are applicable to the rendering of effects, including surface shading and texture creation. These algorithms are provided separately from the application 502, in the form of plug-ins 801. Three-dimensional scenes typically include data defining many objects and their characteristics, and these are stored at 704 as scene data. Configuration data 703 includes various configuration options defined by the user to facilitate operation of the design application in ways that are appropriate to a particular working style. Other data 802 includes temporary data structures used by the operating system 701 and other applications 702 during execution. For example, when downloading design application updates 502 over the network 105, other data 802 will include a TCP/IP stack for receiving and transferring executable instructions to the hard disk drive 306.

Figure 9:
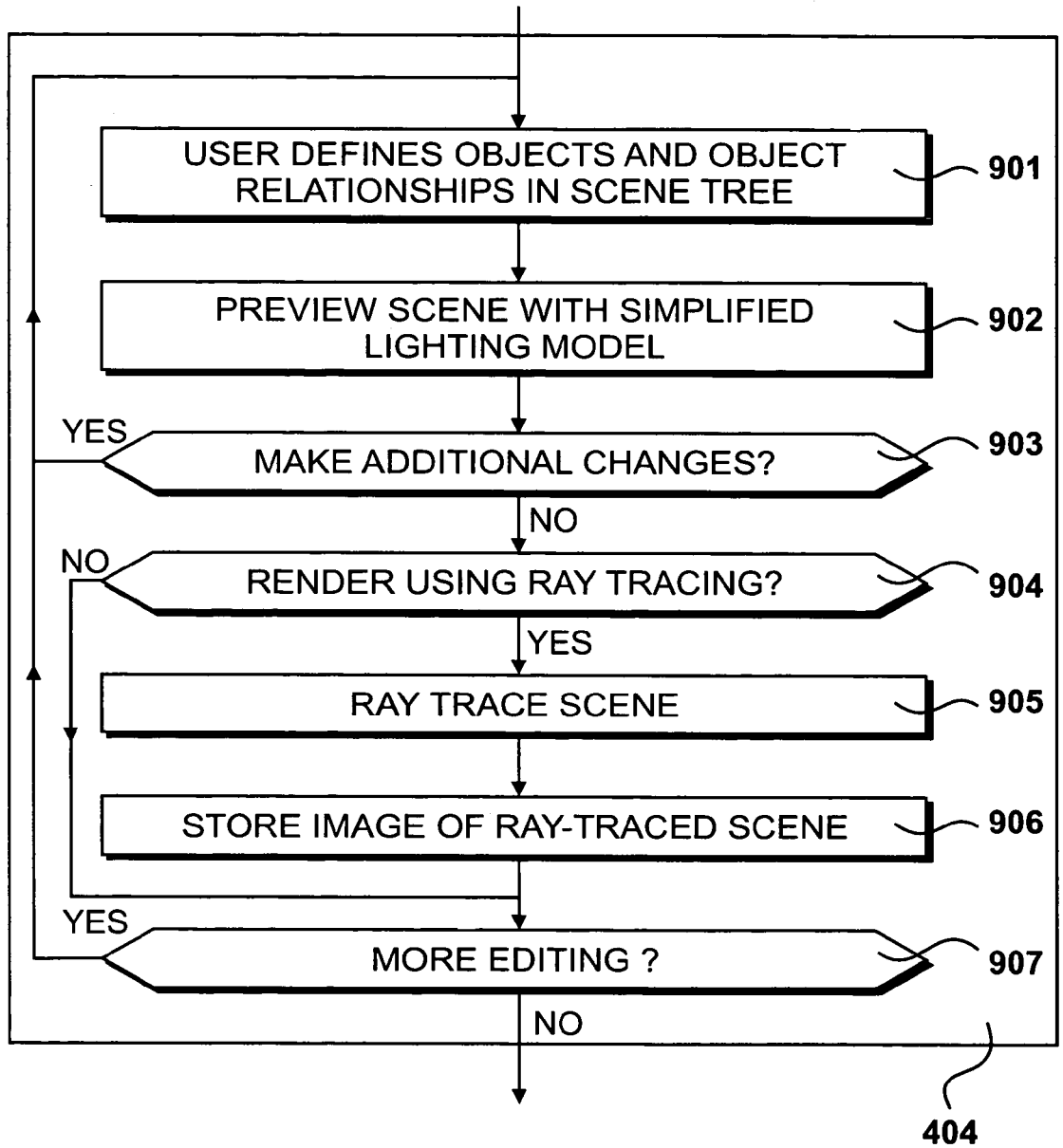
FIG. 9 details the step of running a design application shown in FIG. 4, including a step of ray tracing a scene, according to one embodiment of the present invention.

FIG. 9 shows the step 404 of running the design application shown in FIG. 4, according to one embodiment of the present invention. At step 901 the user defines objects and object relationships in the scene tree stored. These are stored in the scene data 704 shown in FIG. 8. At step 902 the scene is previewed using a simplified lighting model. Photo-realistic scene rendering is a time consuming process, and therefore it is necessary to provide simplified lighting models so that the user can edit and create objects in the scene in real time while still obtaining some indication as to their appearance once rendered. Wire-frame views and other projections are also used to enable the user to preview objects at step 902. At step 903 a question is asked as to whether any additional changes are to be made. If so, control is directed back to step 901 so that more changes can be made to the scene data 704.

Once the user is satisfied with the arrangement of three-dimensional objects in a scene, photo-realistic rendering using ray tracing may be performed. At step 904 a question is asked as to whether ray tracing of the scene is to be performed. If not, control is directed to step 907. Alternatively, ray tracing is performed at step 905. This may take several hours, depending upon the level of quality required. At step 906 the result of ray tracing is stored as an image file on the hard disk drive 306. At step 907 a question is asked as to whether more editing of the scene is to be performed. If so, control is directed back to step 901. Alternatively, this completes the step 404 of running the design application 502. Steps 901 to 907 are shown as being sequential in time. However, it may be advantageous to perform some of these steps to some degree simultaneously. In particular, rendering 905 of a previous scene may be performed as a background operation while new objects are being defined 901.

Figure 10:
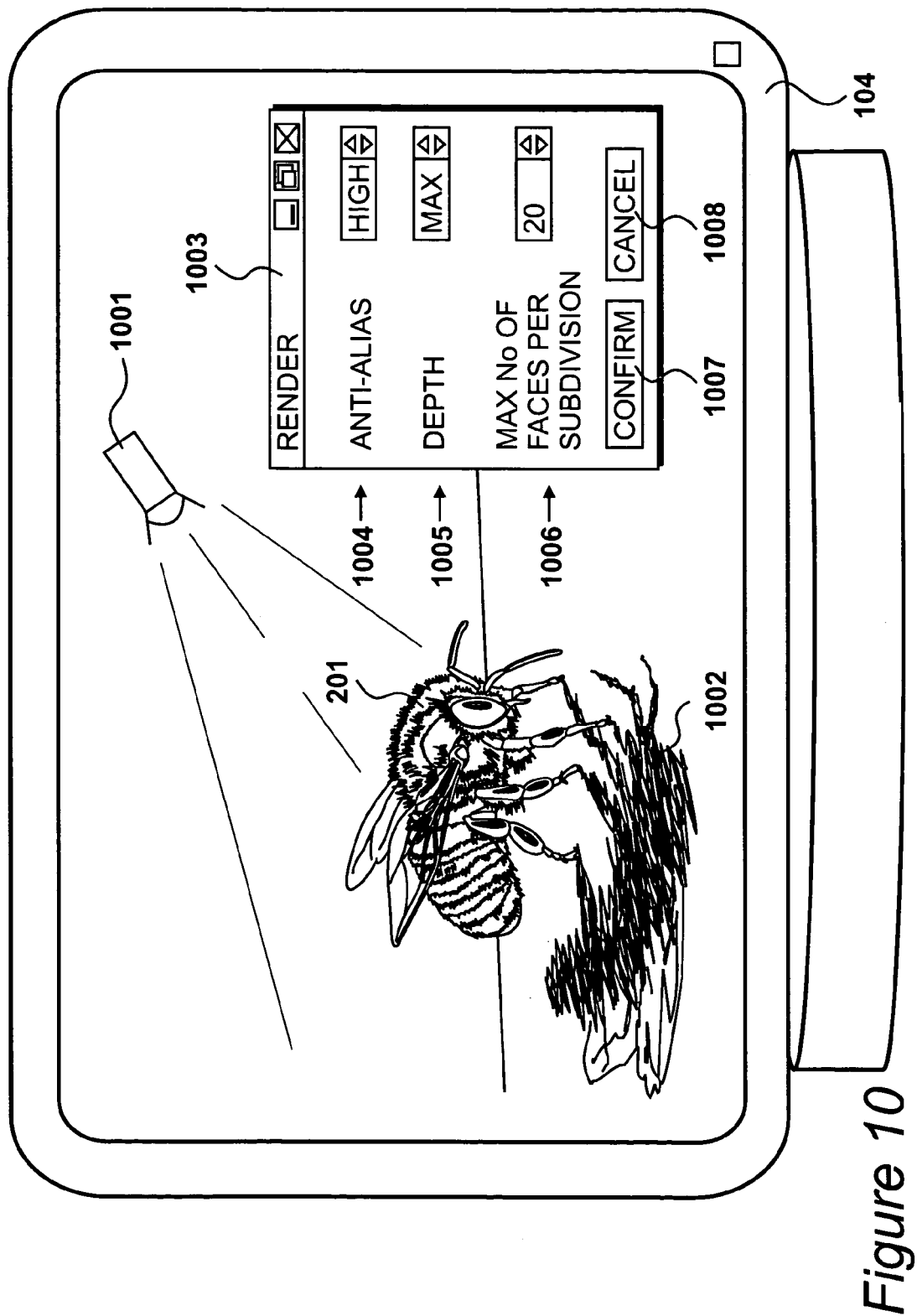
FIG. 10 shows a screenshot of the monitor shown in FIG. 1, during the step of running a design application shown in FIG. 4, according to one embodiment of the present invention.

FIG. 10 shows a screenshot of the monitor 104 while running the design application 502 on the processing system 101, according to one embodiment of the present invention. A light source lights the object 201 and casts a shadow 1002. Shadows and subtle light shading also occur on the surfaces of the object 201, when it is rendered using ray tracing 905. At step 905 in FIG. 9, ray tracing parameters are defined by the user prior to ray tracing being performed. A user interface 1003 allows the user to set parameters that affect the ray tracing process. An anti-alias parameter 1004, a depth parameter 1005 and a maximum number of faces parameter 1006 affect the quality of the resulting ray-traced image. The user may confirm 1007 or cancel 1008 ray tracing once these parameters 1004 to 1006 have been defined.

Figure 11:
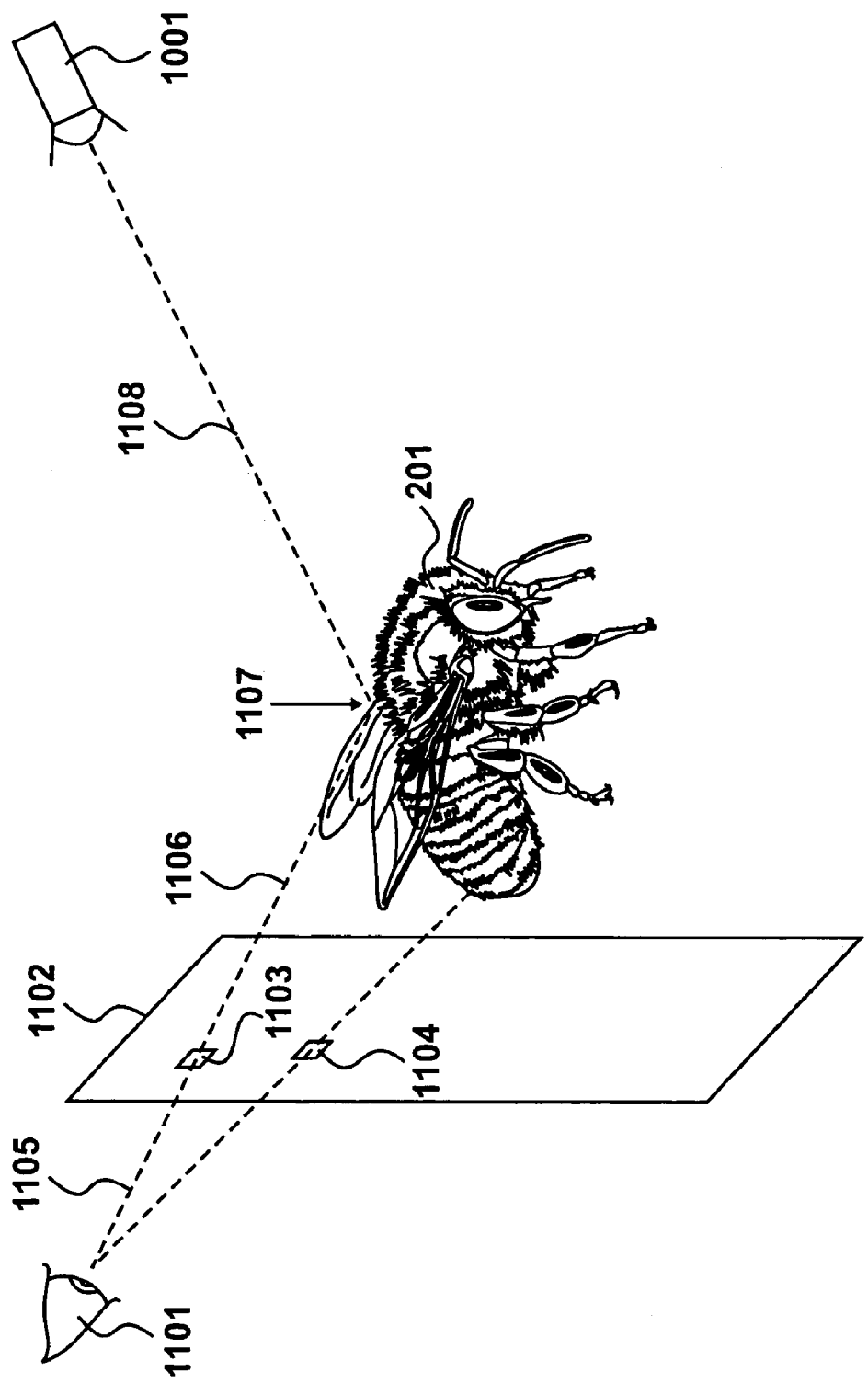
FIG. 11 details an aspect of the ray tracing step shown in FIG. 9, according to one embodiment of the present invention, according to one embodiment of the present invention.

The principle of ray tracing is illustrated in FIG. 11. An eye 1101, or camera viewpoint, is a destination for light rays from an object 201 in a scene. Ray tracing works backwards from the eye 1101, through the image plane 1102 of a monitor 104. The image plane comprises a number of pixels 1103 and 1104, usually numbering several million. A ray 1105 is back-traced from the eye 1101 through a pixel 1103 on the image plane 1102. As the ray passes through the scene 1106 it may intersect 1107 with an object 201. If so, a second ray, known as a shadow ray 1108, is produced in an attempt to directly connect the point of intersection 1107 with a light source 1001. From these paths it is possible to determine the appropriate level of light reaching a pixel 1103. The same process is repeated for all pixels in the image plane 1102. More complex ray paths are required for reflective surfaces, or when translucent surfaces, such as the wings of the honeybee 201, are encountered. The time consuming part of the ray tracing process is deciding whether or not a particular ray trajectory 1106 intersects with an object in the scene.

A complex object such as the honeybee 201 comprises hundreds of thousands of individual object faces, having different sizes, shapes, colors and levels of translucence. Without some form of process optimisation, it would be necessary to check each ray 1106 passing through the image plane 1102 with every one of these faces, to see if the ray intersects. By grouping faces into bounding volumes, a check can be made first with a bounding volume, before it becomes necessary to check with all the object faces that it contains. This provides an enormous saving in computational time. However, the way in which bounding volumes are subdivided hierarchically has an impact on the amount of processing required and the resulting quality of the rendered image.

Further processing is required when anti-aliasing is performed. In its simplest form, ray tracing back-traces a single ray from the eye 1101 through each individual pixel 1103, 1104 in the image plane, generating color values for each pixel as a result. However, sharp transitions and fine details of objects rendered in this way are distorted because the pixel spacing on the image plane 1102 is not sufficiently fine to render this resulting level of detail. This type of distortion is known as aliasing. Anti-aliasing increases the effective number of pixels in the image plane, and then applies a smoothing filter to the resulting high-resolution image, so that the final image is at the required level of resolution. However, the amount of processing required is again increased, due to the number of ray intersections with object faces that must be tested. This further emphasises the need for an efficient hierarchy of subdivided volumes. At the same time, when high quality anti-aliasing is used, it is necessary to avoid image artefacts from other characteristics of the rendering process, that may only become apparent when anti-aliasing is used. An efficient hierarchy of bounding volumes improves quality as well as processing time, since it is possible to apply processing effort at those parts of the scene that most require it, if the hierarchy of bounding volumes is appropriately constructed.

Figure 12:
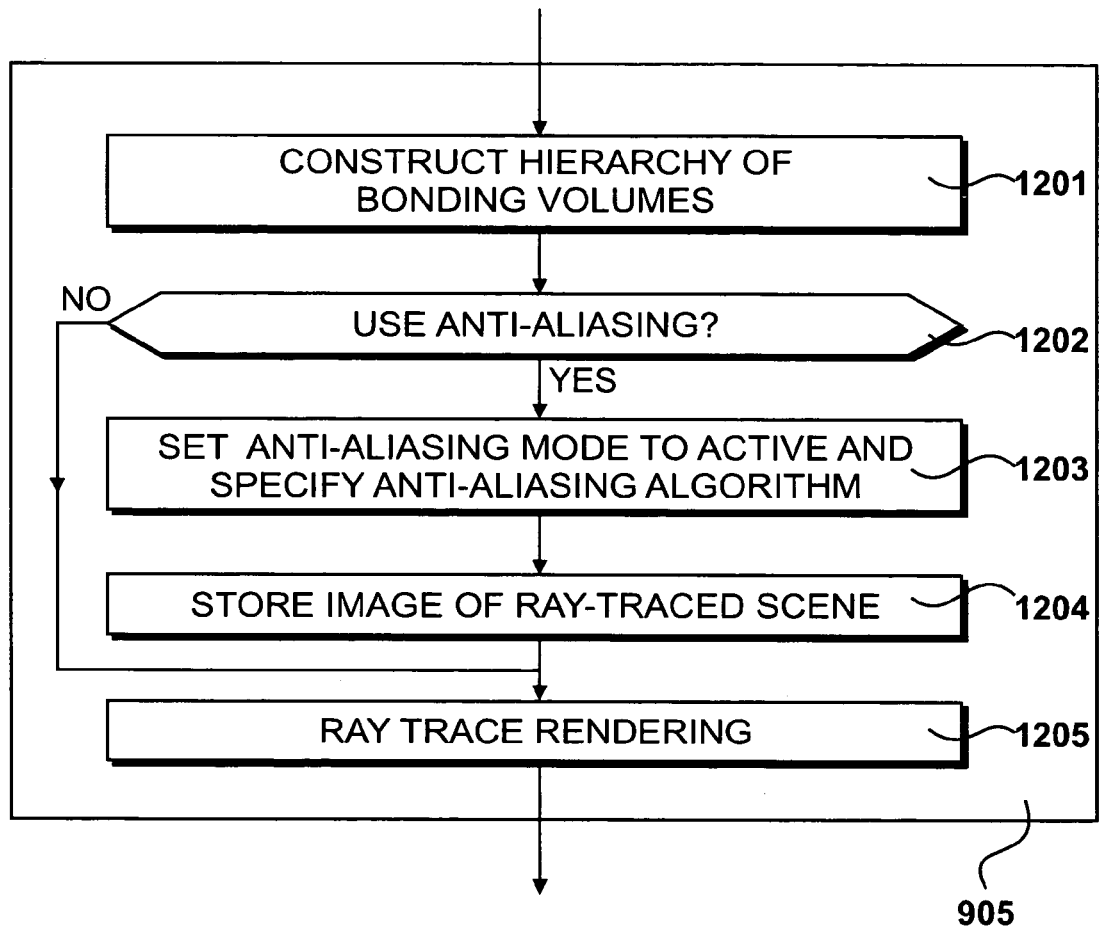
FIG. 12 details the step of ray tracing a scene shown in FIG. 9, including a step of constructing a hierarchy of bounding volumes, according to one embodiment of the present invention.

FIG. 12 shows the step 905 of ray-tracing a scene shown in FIG. 9, according to one embodiment of the present invention. At step 1201 a hierarchy of bounding volumes is constructed. At step 1202 a question is asked as to whether anti-aliasing is to be used. If so, anti-aliasing mode is set to active and an anti-aliasing algorithm is specified at step 1203. Thereafter, or if anti-aliasing mode has not been set, control is directed to step 1204. At step 1204 ray trace rendering is performed using the hierarchy of bounding volumes created at step 1201.

Figure 13:
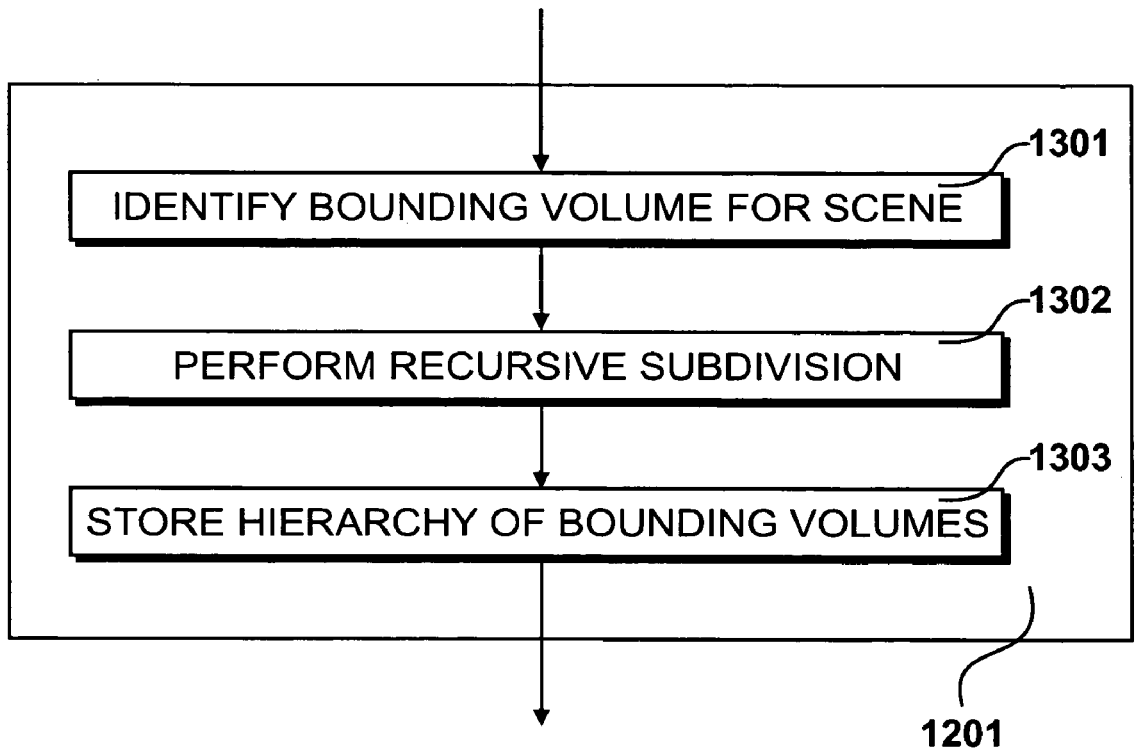
FIG. 13 details the step of constructing a hierarchy of bounding volumes shown in FIG. 12, including a step of performing recursive subdivision, according to one embodiment of the present invention.

The step 1201 of constructing a hierarchy of bounding volumes shown in FIG. 12 is detailed in FIG. 13, according to one embodiment of the present invention. At step 1301 an outer bounding volume for the scene 704 is identified. At step 1302 recursive subdivision of this bounding volume is performed. At step 1303 the resulting hierarchy of bounding volumes is stored.

Figure 14:
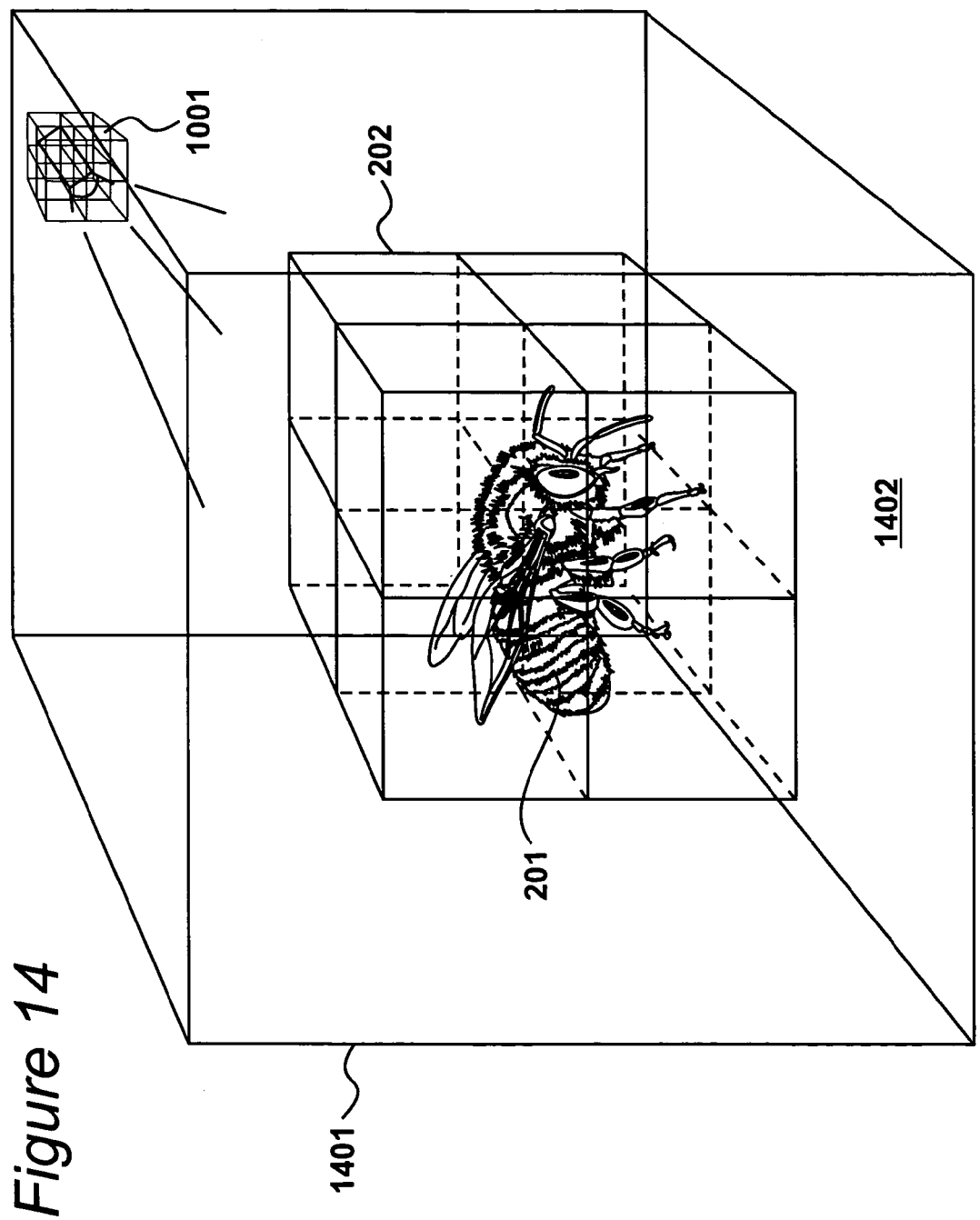
FIG. 14 illustrates an effect of the steps carried out in FIG. 13, according to one embodiment of the present invention.

FIG. 14 shows an illustration of the effects of the steps shown in FIG. 13, according to one embodiment of the present invention. A bounding volume 1401 for the entire scene includes the light source 1001, the honeybee 201 and the surface 1402 upon which the honeybee 201 is resting and casting a shadow. The volume of space near the object 201 has been recursively subdivided into smaller bounding volumes according to the object's complexity. These smaller bounding volumes are not necessarily symmetric, nor are they necessarily precise subdivisions of each other. In the illustration, cubic or rectangular volumes are shown. However, spherical or other shaped volume subdivisions may be used in addition or instead. The volume of space around the light source 1001 is also subdivided hierarchically.

Figure 15:
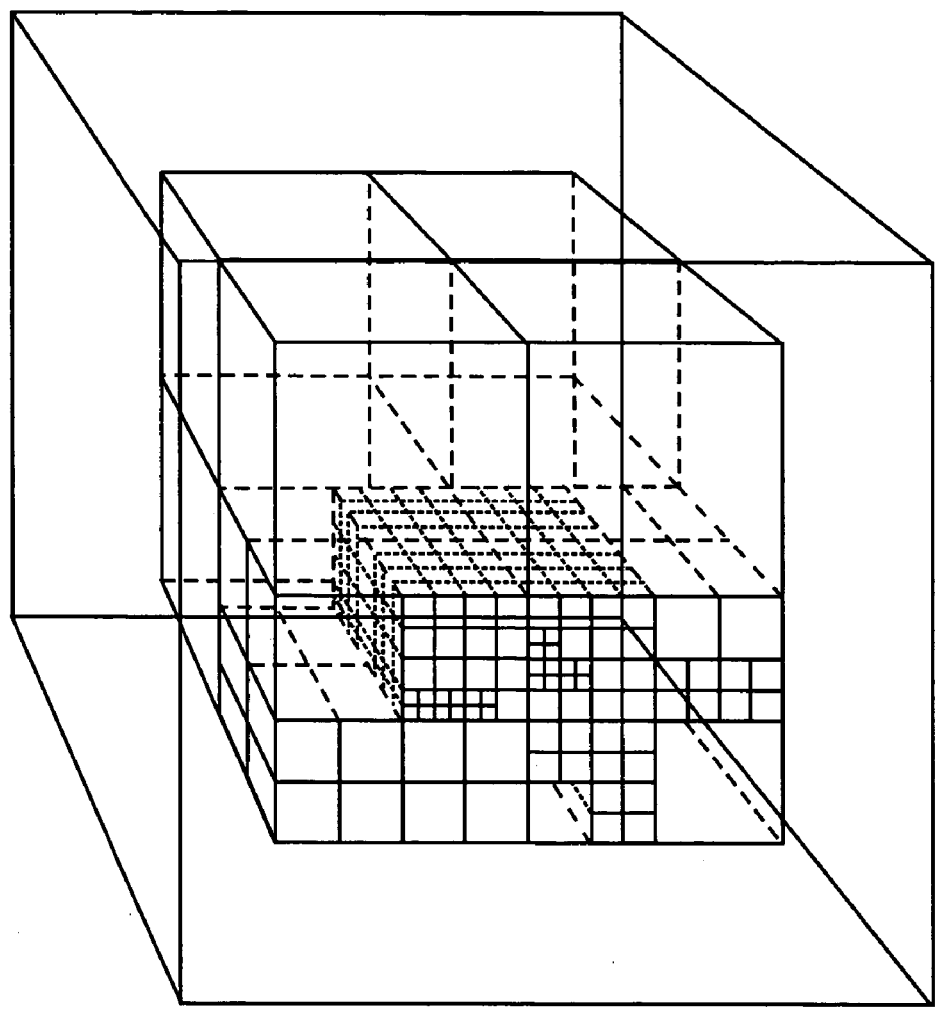
FIG. 15 further illustrates effects of the steps carried out in FIG. 14, according to one embodiment of the present invention.

Details of volume subdivisions are further illustrated in FIG. 15, according to one embodiment of the present invention, where objects causing the subdivisions are excluded for the sake of clarity. In the illustration shown in FIG. 15, the subdivisions are regular. In practice, however, the subdivisions adapt to best contain object faces contained entirely within them, and are not necessarily regular or symmetric.

Figure 16:
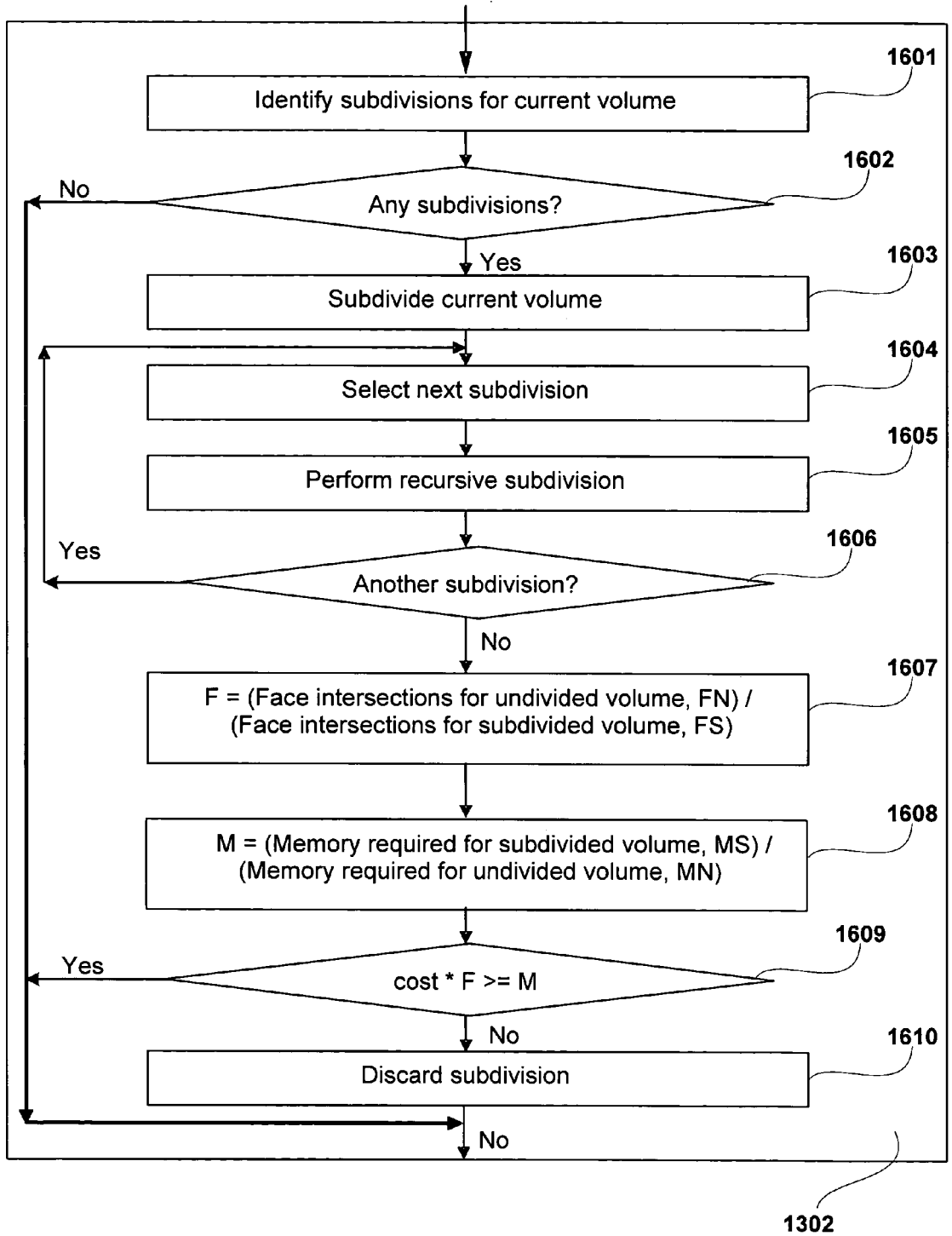
FIG. 16 details the step of performing recursive subdivision shown in FIG. 13, including a step of identifying subdivisions, a step of identifying memory requirements and a step of identifying face intersections, according to one embodiment of the present invention.

FIG. 16 shows the step 1302 of performing recursive subdivision shown in FIG. 13, according to one embodiment of the present invention. The steps of FIG. 16 are a practical implementation of the invention shown in FIG. 2. At step 1601 subdivisions are identified within the current volume. Initially the current volume is the bounding volume 1401 for the whole scene. However, as recursion proceeds, the current volume becomes one of any of the smaller bounding volumes that are created during recursion. Subdivisions need not be regular or symmetric and may be influenced by the location of objects within a volume. At step 1602 a question is asked as to whether any subdivisions have been identified at step 1601. If not, no further subdivisions of the current volume are performed. Alternatively, subdivisions are identified, and control is directed to step 1603.

At step 1603 the current volume is subdivided. At step 1604 the first of these newly subdivided volumes is selected. At step 1605 recursive subdivision of the selected volume is performed, in accordance with the steps shown in FIG. 16. At step 1606 a question is asked as to whether another subdivision needs to be recursively subdivided. If so, control is directed to step 1604. Alternatively, when all newly subdivided volumes have been recursively subdivided themselves, a subdivided volume is produced and control is directed to step 1607.

At step 1607 two values, FN and FS are identified. FN is an estimate of the likely number of face intersections that would have to be tested for a ray passing through the undivided form of the current volume. FS is an estimate of the likely number of face intersections that would have to be tested for a ray passing through the subdivisions of the current volume. A value F is assigned to the ratio of FN/FS. Value F expresses the increase in efficiency due to a comparison of the number of face intersections required for a typical ray trace through the current volume in its undivided and divided forms. At step 1608 two further values, MN and MS are identified. MN is the memory required to store the undivided current volume. MS is the memory required to store the identified volume subdivisions in the current volume. A value M is assigned to the ratio of MS/MN. Value M expresses a memory cost factor for implementing this increase in efficiency.

At step 1609 a comparison between these two factors is performed. In some embodiments of the present invention F is scaled by a cost factor. The cost factor may be set using a configuration file and have a default value of 1.0. If the increase in computational efficiency is greater than or equal to the memory cost factor, the subdivided volume is kept this completes the steps for subdividing a bounding volume. If not, at step 1610 the subdivided volume is discarded.

Figure 17:
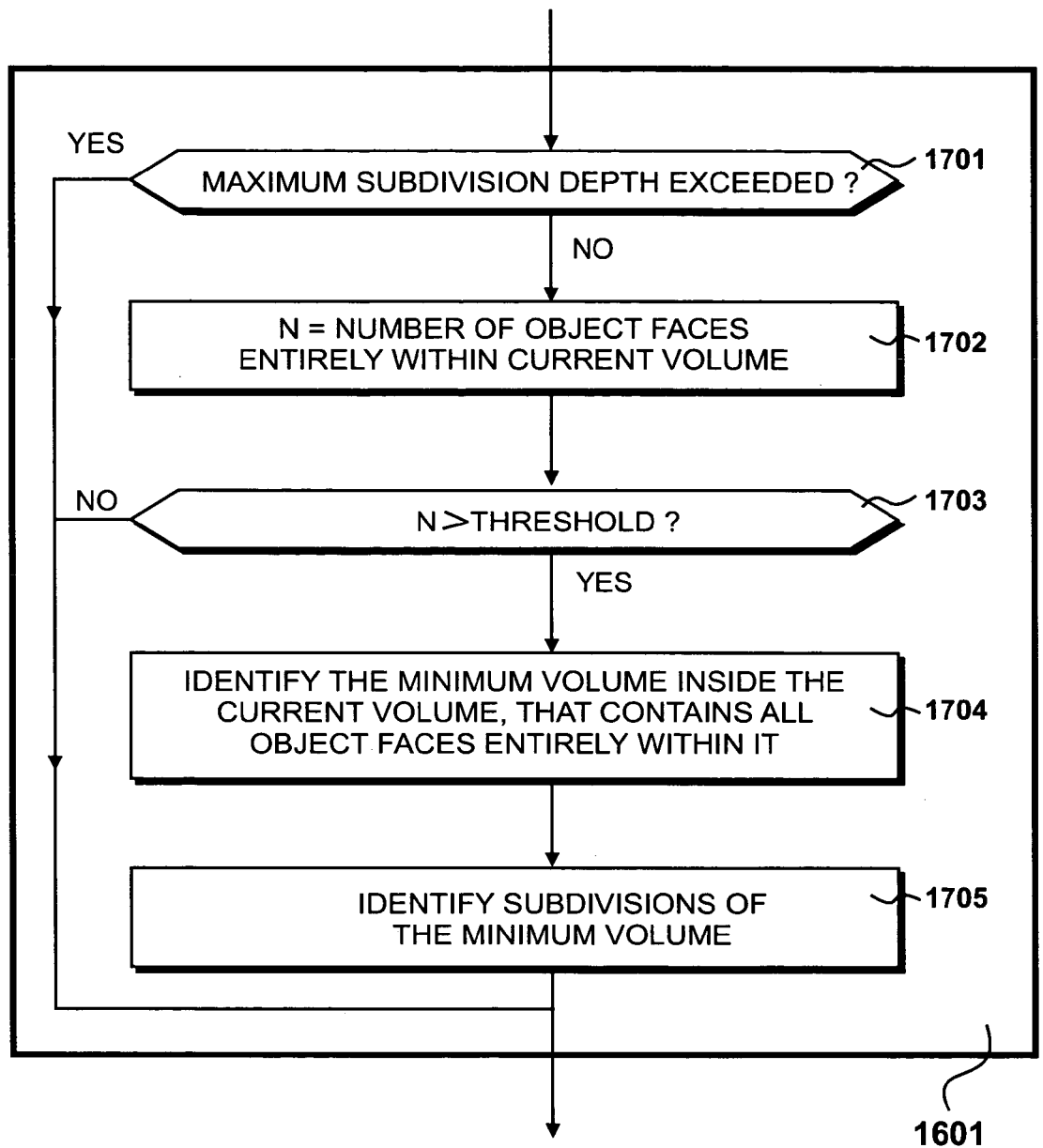
FIG. 17 details the step of identifying subdivisions shown in FIG. 16, according to one embodiment of the present invention.

FIG. 17 shows the step 1601 of identifying subdivisions for the current volume, shown in FIG. 16, according to one embodiment of the present invention. At step 1701 a question is asked as to whether the maximum subdivision depth 1005 has been exceeded. This is a user-definable parameter that may be set using the user-interface 1003 shown in FIG. 10. If the maximum depth is exceeded, no subdivisions are identified. At step 1702 the number, N, of object faces entirely contained within the current volume is identified. At step 1703 a question is asked as to whether N exceeds the threshold value 1006 set by the user. If not, subdivisions are not identified. Alternatively, control is directed to step 1704. At step 1704 the minimum volume entirely containing all object faces within the current volume is identified. At step 1705 subdivisions of this minimum volume are identified. These can be regular, cubic, cuboid, spherical or other shape. Cubic or spherical shapes provide simpler mathematical tests when performing the ray trace rendering of step 1204, although it is possible that the advantages of other shapes may outweigh the increase in mathematical complexity in some circumstances.

Figure 18:
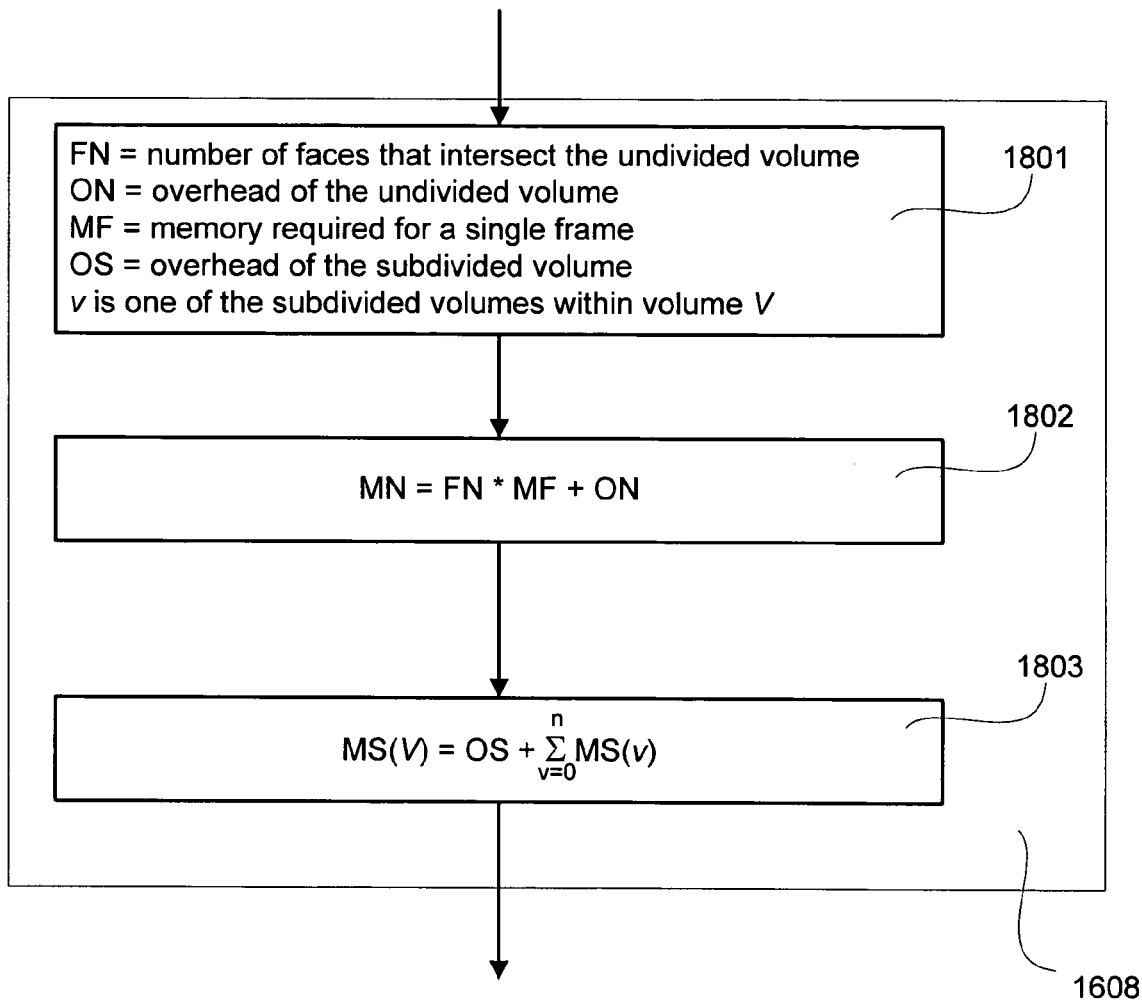
FIG. 18 details the step of identifying memory requirements shown in FIG. 16, according to one embodiment of the present invention.

FIG. 18 shows the step 1608 in which values for MN and MS are identified, according to one embodiment of the present invention. At step 1801 variables FN, ON, OS, and MF are identified. FN is assigned to the number of faces that intersect the volume that will be subdivided, i.e., the undivided volume. ON is assigned as being the overhead of the undivided volume, specifically the size of the object that contains the faces. OS is assigned as being the overhead of a subdivided volume, specifically the size of the object containing the sub-volumes. In some embodiments of the present invention, ON and OS are computed by a compiler. MF is the memory required for a single frame. At step 1802 the current memory requirement for the undivided volume, MN is calculated in the following way:

$$MN=FN*MF+ON.$$

At step 1803 the value of MS is calculated in the following way:

$$MS(V)=OS+\Sigma MS(v),$$

MS(V) is calculated as a function of the subdivided volume, V for v ranging from 0 to n, where n is the number of volumes contained in V. The value of MS may be calculated differently according to the implementation of the hierarchical bounded volume structure.

Figure 19:
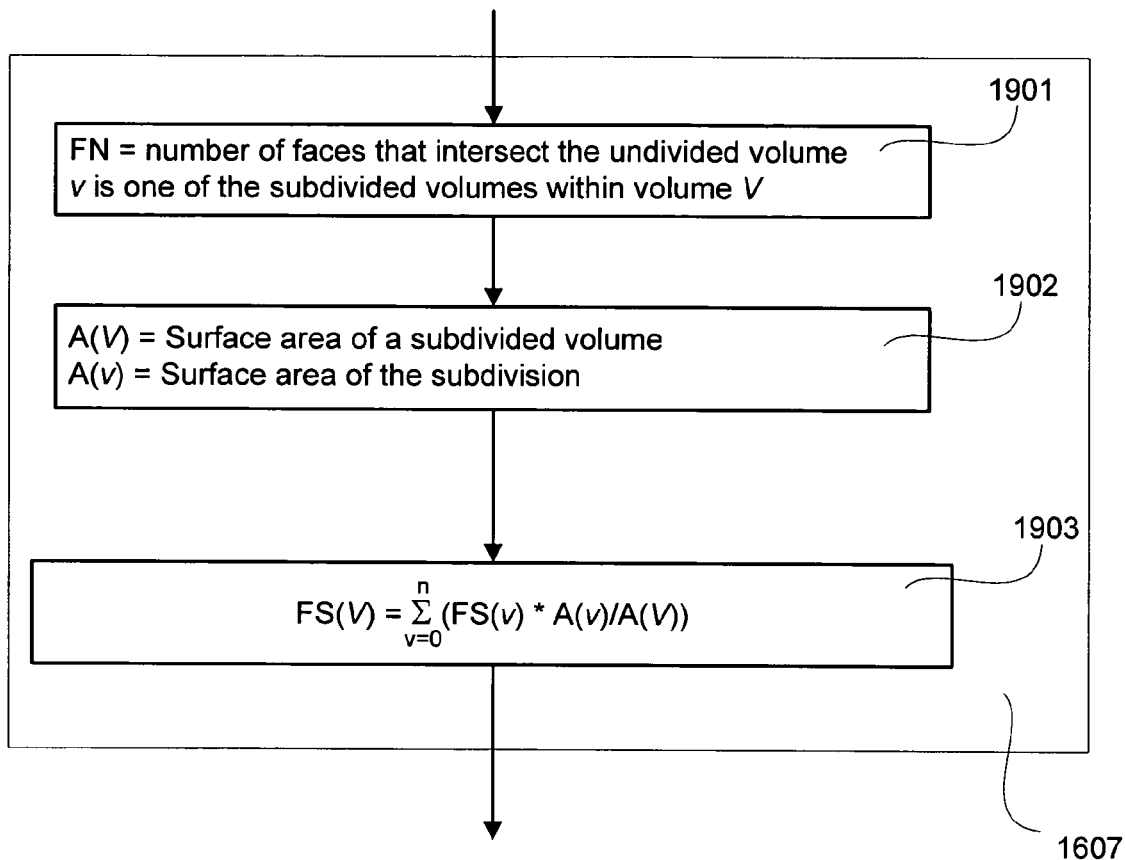
FIG. 19 details the step of identifying face intersections shown in FIG. 16, according to one embodiment of the present invention.

FIG. 19 shows the step 1607 in which values for FS and FN are identified, according to one embodiment of the present invention. At step 1901 FN is assigned to the number of face-ray intersections that intersect the undivided volume. At step 1902 variables FS(V), A(v), and A(V) are identified. FS(V) is calculated as a function of FS(v), specifically as the sum of the intersections of the subdivided volume, V for v ranging from 0 to n, where n is the number of volumes contained in V. A(v) is assigned to the surface area of a volume contained in V. A(V) is assigned to the surface area of the subdivided volume. At step 1903 FS is calculated in the following way:

$$FS(V)=\Sigma(FS(v)*A(v)/A(V)).$$

The invention has been described above with reference to specific embodiments. Persons skilled in the art will recognize, however, that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A computer readable medium storing instructions for causing a computer to generate a hierarchy of bounding volumes for objects in a three-dimensional space, performing the steps of:
   identifying an outer bounding volume including the objects;
   computing a memory cost factor;
   computing a face intersection factor;
   subdividing the outer bounding volume into a set of smaller bounding volumes based on the memory cost factor and the face intersection factor; and
   recursively subdividing each smaller bounding volume within the set of smaller bounding volumes to produce a set of recursively smaller bounding volumes based on a memory cost factor and a face intersection factor computed for each smaller bounding volume, the outer bounding volume and the set of recursively smaller bounding volumes defining the hierarchy of bounding volumes.

2. The computer readable medium of claim 1, wherein the memory cost factor is a ratio of a first value and a second value, the first value an amount of memory needed to store a first bounding volume and the second value an amount of memory needed to store subdivisions of the first bounding volume.

3. The computer readable medium of claim 1, wherein the face intersection factor is a ratio of a first face intersection estimate and a second face intersection estimate, the first face intersection estimate corresponding to a number of faces intersected by a ray passing through a first bounding volume and the second face intersection estimate corresponding to a number of faces Intersected by a ray passing through subdivisions of the first bounding volume.

4. The computer readable medium of claim 1, wherein a smaller bounding volume is subdivided when the memory cost factor computed for the smaller bounding volume is less than the face intersection factor computed for the smaller bounding volume.

5. The computer readable medium of claim 1, further comprising the step of storing the hierarchy of bounding volumes.

6. The computer readable medium of claim 3, wherein the face intersection factor is scaled by a cost factor.

7. The computer readable medium of claim 1, wherein the smaller bounding volumes within the set of smaller bounding volumes are cubic bounding volumes or rectangular bounding volumes.

8. The computer readable medium of claim 1, further comprising the step of ray tracing the objects in the hierarchy of bounding volumes to produce a two dimensional image.

9. The computer readable medium of claim 1, wherein the subdividing of a smaller bounding volume within the set of smaller bounding volumes is based on a threshold representing a number of object faces that intersect the smaller bounding volume.

10. A method for generating a hierarchy of bounding volumes for objects in a three-dimensional space, comprising:
- identifying an outer bounding volume including the objects;
- computing a memory cost factor;
- computing a face intersection factor;
- subdividing the outer bounding volume into a set of smaller bounding volumes based on the memory cost factor and the face intersection factor; and
- recursively subdividing each smaller bounding volume within the set of smaller bounding volumes to produce a set of recursively smaller bounding volumes based on a memory cost factor and a face intersection factor computed for each smaller bounding volume, the outer bounding volume and the set of recursively smaller bounding volumes defining the hierarchy of bounding volumes.

11. The method of claim 10, wherein the memory cost factor is a ratio of a first value and a second value, the first value an amount of memory needed to store a first bounding volume and the second value an amount of memory needed to store subdivisions of the first bounding volume.

12. The method of claim 10, wherein the face intersection factor is a ratio of a first face intersection estimate and a second face intersection estimate, the first face intersection estimate corresponding to a number of faces intersected by a ray passing through a first bounding volume and the second face intersection estimate corresponding to a number of faces Intersected by a ray passing through subdivisions of the first bounding volume.

13. The method of claim 10, wherein a smaller bounding volume is subdivided when the memory cost factor computed for the smaller bounding volume is less than the face intersection factor computed for the smaller bounding volume.

14. The method of claim 10, wherein the face intersection factor is scaled by a cost factor.

15. The method of claim 10, wherein the smaller bounding volumes within the set of smaller bounding volumes are cubic bounding volumes or rectangular bounding volumes.

16. The method of claim 10, further comprising the step of ray tracing the objects in the hierarchy of bounding volumes to produce a two dimensional image.

17. A system for generating a hierarchy of bounding volumes for objects in a three-dimensional space, the system comprising:
- means for identifying an outer bounding volume including the objects;
- means for computing a memory cost factor;
- means for computing a face intersection factor;
- means for subdividing the outer bounding volume into a set of smaller bounding volumes based on the memory cost factor and the face intersection factor; and
- means for recursively subdividing each smaller bounding volume within the set of smaller bounding volumes to produce a set of recursively smaller bounding volumes based on a memory cost factor and a face intersection factor computed for each smaller bounding volume, the outer bounding volume and the set of recursively smaller bounding volumes defining the hierarchy of bounding volumes.

18. The system of claim 17, further comprising means for determining an amount of memory needed to store a bounding volume.

19. The system of claim 17, further comprising means for determining an estimate of a number of faces intersected by a ray passing through a bounding volume.

20. The system of claim 17, further comprising means for ray tracing the objects in the hierarchy of bounding volumes to produce a two dimensional image.

* * * * *

UNITED STATES PATENT AND TRADEMARK OFFICE
CERTIFICATE OF CORRECTION

PATENT NO. : 7,164,420 B2 Page 1 of 1
APPLICATION NO. : 10/897048
DATED : January 16, 2007
INVENTOR(S) : Cleve Ard It is certified that error appears in the above-identified patent and that said Letters Patent is hereby corrected as shown below:

In column 10, line 42, replace "Intersected" with --intersected--

In column 11, line 24, replace "whereIn" with --wherein--

In column 11, line 30, replace "Intersected" with --intersected--

Signed and Sealed this

Twenty-fourth Day of April, 2007

JON W. DUDAS
*Director of the United States Patent and Trademark Office*